US007323852B2

(12) United States Patent
Hoffman

(10) Patent No.: US 7,323,852 B2
(45) Date of Patent: Jan. 29, 2008

(54) SENSING LOAD TAP CHANGER (LTC) CONDITIONS

(76) Inventor: Gary R. Hoffman, 32 Phyllis Pl., Randolph, NJ (US) 07869

( * ) Notice: Subject to any disclaimer, the term of this patent is extended or adjusted under 35 U.S.C. 154(b) by 0 days.

(21) Appl. No.: 11/520,542

(22) Filed: Sep. 13, 2006

(65) Prior Publication Data

US 2007/0057651 A1 Mar. 15, 2007

Related U.S. Application Data

(60) Provisional application No. 60/716,996, filed on Sep. 14, 2005, provisional application No. 60/717,000, filed on Sep. 14, 2005.

(51) Int. Cl.
*G05F 1/16* (2006.01)
*G05B 24/02* (2006.01)

(52) U.S. Cl. ...................... 323/258; 323/260; 323/341; 323/342

(58) Field of Classification Search ................ 323/258, 323/260, 341, 342
See application file for complete search history.

(56) References Cited

U.S. PATENT DOCUMENTS 3,855,503 A * 12/1974 Ristuccia ..................... 361/37
6,052,060 A * 4/2000 Butler et al. ................ 340/644
6,062,821 A * 5/2000 Golner et al. ................. 417/12
6,446,027 B1 * 9/2002 O'Keeffe et al. ........... 702/183
6,906,630 B2 * 6/2005 Georges et al. ............. 340/646
7,089,145 B2 * 8/2006 Stenestam et al. .......... 702/130

* cited by examiner

*Primary Examiner*—Bao Q. Vu
(74) *Attorney, Agent, or Firm*—Henry I. Schanzer

(57) ABSTRACT

A load tap changer (LTC) having a plurality of windings is coupled to one of the primary and secondary of a power transformer in order to regulate the output voltage of the transformer. The LTC includes a plurality of taps physically and electrically connected to and along the windings and a contacting element is selectively moved along the taps to increase or decrease the output voltage of the transformer. The power transformer and the LTC windings are placed in a main tank and the taps are placed in an LTC tank. The temperature in the main tank and the temperature in the LTC tank are monitored by means of first and second temperature probes whose outputs are used to sense the temperature differential ($T_{DIFF}$) between the main tank and the LTC tank and to determine if the LTC tank temperature exceeds the main tank temperature for a period of time exceeding a specified time period. Also included is circuitry for sensing the rate of change of $T_{DIFF}$ and determining if it exceeds a predetermined value.

15 Claims, 7 Drawing Sheets

LOAD TAP CHANGER IN PRIMARY CIRCUIT

LOAD TAP CHANGER IN SECONDARY CIRCUIT

SENSING LOAD TAP CHANGER (LTC) CONDITIONS

This invention claims priority from provisional application Ser. No. 60/716,996 titled Load Tap Changer Condition Monitoring Method filed Sep. 14, 2005 and provisional application Ser. No. 60/717,000 for Load Tap Changer Position Monitoring Method filed Sep. 14, 2005.

BACKGROUND OF THE INVENTION

This invention relates to apparatus and method for sensing certain components of a load tap changers (LTC) under various operating conditions.

Load Tap Changers (LTCs) are used in electric power systems to regulate the voltage distributed from substations and along the power lines. An LTC, as used and defined herein and in the appended claims, may be connected in the primary circuit of a power transformer, XFR, as shown in FIG. 1, or in the secondary circuit as shown in FIG. 2. FIG. 1, is a highly simplified version of a prior art system illustrating use of one type of LTC connected in the primary circuit of a power transformer (XFR). In FIG. 1, there is shown the primary (P1) of a power transformer (XFR) to which is coupled the windings 100*a* and taps 100*b* of a load tap changer (LTC), 100. Note that in the discussion to follow and in the appended claims, windings 100*a*, whether connected in the primary or the secondary of the power transformer, may also be referred to as the LTC windings. The LTC may be used to change the effective turns ratio (N1:N2) of the primary and secondary of the power transformer XFR and thereby its output voltage (Vout). The LTC 100 of FIG. 1 is shown to include several taps ($T_0$-$T_M$) which are contacted with a movable contacting element, or contact, C1. The number of taps may vary from a few to many. The movable contact C1 is shown mounted on a tap changer mechanism 105 which is caused to move along the taps $T_0$-$T_M$ by a rotatable shaft 103 driven by a motor M1. The shaft 103 can move in a clockwise direction or in a counterclockwise direction and causes contact C1 to advance from tap to tap. For purpose of illustration, in FIG. 1, the contact C1 is shown to be movable in either a down to up direction (from $T_0$ to $T_M$) or in an up to down direction (from $T_M$ to $T_0$). In actual systems, the taps may be physically arranged in a circular pattern and the contacting element would then move along a rotary or other suitable path, rather than linearly up and down.

In FIG. 1, the windings 100*a*, extending between nodes 14 and 16, are connectable in series with the primary windings (P1) of the power transformer XFR. One end 11 of P1 is connected to an input power terminal 17 while the other end 13 of P1 is connected to the top end 14 of the windings 100*a*. Taps $T_0$ through $T_M$ are disposed along the LTC windings, with the lowest tap, $T_0$, corresponding to node 16 and the highest tap, $T_M$, corresponding to node 14. For ease of illustration, contact C1, shown mounted on a movable arm depending from mechanism 105, is electrically connected to input power terminal 19 and provides a very low impedance connection between terminal 19 and whichever tap it is contacting. The input power Vin is applied between terminals 17 and 19 and is redistributed via the secondary of the power transformer, XFR, onto output power lines 21, 23. When C1 is connected to tap $T_0$ the primary winding P1 is connected in series with all the windings 100*a* of the LTC and the effective turns ratio of the primary (e.g., N1) to the secondary (e.g., N2) has been increased. For this condition, the output voltage (Vout) produced at the output of the secondary (SEC1) is decreased. When C1 is connected to tap $T_M$ the effective turns ratio of the primary to the secondary is decreased and the output voltage (Vout) produced at the output of the secondary (SEC1) is increased.

In the operation of the system (see FIGS. 1 and 2) the voltage Vout, across the secondary of the power transformer is supplied, via a transformer PT10, to a tap change controller 101 which senses the voltage and produces signals identified as K1 (lower) and K2 (raise). Signals K1 and K2 are applied to the motor M1 and determine whether the motor is driven in a clockwise or counterclockwise direction causing shaft 103 to turn so as to raise or lower tap changer mechanism 105 causing C1 to move along the taps of the LTC windings 100*a*. If Vout is below some desired level, the controller 101 produces signals (K1, K2) which function to tend to raise Vout to the desired value. Likewise, if Vout is above some desired level, controller 101 produces signals (K1, K2) which function to tend to lower Vout to the desired value.

As noted, motor M1 causes the rotation of drive shaft 103 on which is mounted tap changer mechanism 105 which controls the movement of contacting element C1 along the taps 100*b* of LTC windings 100*a*. Mechanism 105 may include gears, cams and switches (not shown) which cause the contact C1 to make contact with the taps in a predetermined sequence.

In the configuration of FIG. 2, windings 100*a* are connectable in series with the windings of the secondary of the power transformer. As in FIG. 1, which one(s) of the windings 100*a* get connected in circuit with the secondary windings is a function of which tap is contacted by contact C1. For the condition of contact C1 connected to tap $T_0$, the turns ratio of the primary to secondary is decreased (Vout is increased). For the condition of contact C1 connected to tap $T_M$, the turns ratio of the primary to secondary is increased (Vout is decreased). In FIG. 2, as in FIG. 1, the voltage across the secondary is coupled via a transformer PT10 to a tap change controller 101 which drives a motor M1 which drives a shaft 103*a* which causes a mechanism 105*a* to raise or lower the contact C1 to produce a desired Vout. Thus in FIGS. 1 and 2 there is a feedback loop including controller 101 which functions to try to maintain the output voltage at a desired value.

It should be noted, as detailed below, that the power transformer is normally located in a main, oil filled, tank and the LTC taps are located a separate, oil filled, tank, referred to herein as the LTC tank. Generally the temperature of the main tank is significantly higher than the temperature of the LTC tank. However, problems exist in that, for some operating conditions, the temperature of the LTC tank may increase and be greater than the temperature of the main tank. For example, some of the taps may be, or become inoperative. When this occurs the temperature of the LTC tank may rise considerably and exceed the temperature of the main tank. The increase in temperature, especially if it persists for a long time, may result in a highly dangerous situation. Also, due to some malfunctions, the temperature of the LTC tank may rise at a faster rate than a specified amount.

It is an object of this invention to monitor the temperature of the main tank and of the LTC tank and to identify problem conditions to prevent sensed increases in temperature from resulting in a dangerous condition.

SUMMARY OF THE INVENTION

Systems and methods embodying the invention include: (a) means for sensing and monitoring the LTC tank temperature versus the main tank temperature to determine if, and when, the temperature of the LTC tank exceeds that of the main tank; and (b) means for determining the rate of rise of the LTC tank temperature (or a differential temperature rise) to monitor any change occurring at a relatively rapid rate.

The temperatures of the main tank and of the LTC tank are continuously monitored to determine if, and when, the temperature of the LTC tank exceeds that of the main tank and if the condition persists for more than a predetermined period of time. This measurement is generally intended to sense the occurrence of a relatively slowly developing problem. In accordance with the invention, the rate of rise of the LTC tank temperature is also monitored to determine whether any rapidly evolving problems (e.g., due to arcing) are present.

Sensing and monitoring slowly and rapidly evolving problematic conditions results in an improved and efficient system for generating alarms and taking necessary steps to prevent significant damage and/or a dangerous condition from becoming overwhelming.

In one embodiment, the arithmetic difference of the temperature between the main tank ($T_{TANK}$) and the LTC tank ($T_{LTC}$) is calculated to determine whether the temperature in the LTC tank is more, or less, than the temperature in the main tank. This is monitored to determine if, and when, the temperature of the LTC tank exceeds the temperature in the main tank. If the LTC tank temperature ($T_{LTC}$) exceeds the main tank temperature ($T_K$) by a preset amount for longer than a preset period of time, alarm conditions are produced indicating that a problem may be present. In addition, for each tap position the corresponding temperature of the LTC tank is monitored to determine whether there are any heating problems associated with that tap position. This information is important to determine whether a tap position is defective and whether corrective action should be taken (e.g., the contacting element may be moved to another tap and the defective tap by-passed at this time and in the future).

BRIEF DESCRIPTION OF THE DRAWINGS

In the accompanying drawing like reference characters denote like components.

DETAILED DESCRIPTION OF THE INVENTION

Note that certain aspects of this invention are also described in my co-pending application titled APPARATUS AND METHOD FOR MONITORING TAP POSITIONS OF LOAD TAP CHANGER bearing Ser. No. 11/520,821 and filed on the same day as this application and the teachings of which are incorporated herein by reference.

Figure 1:
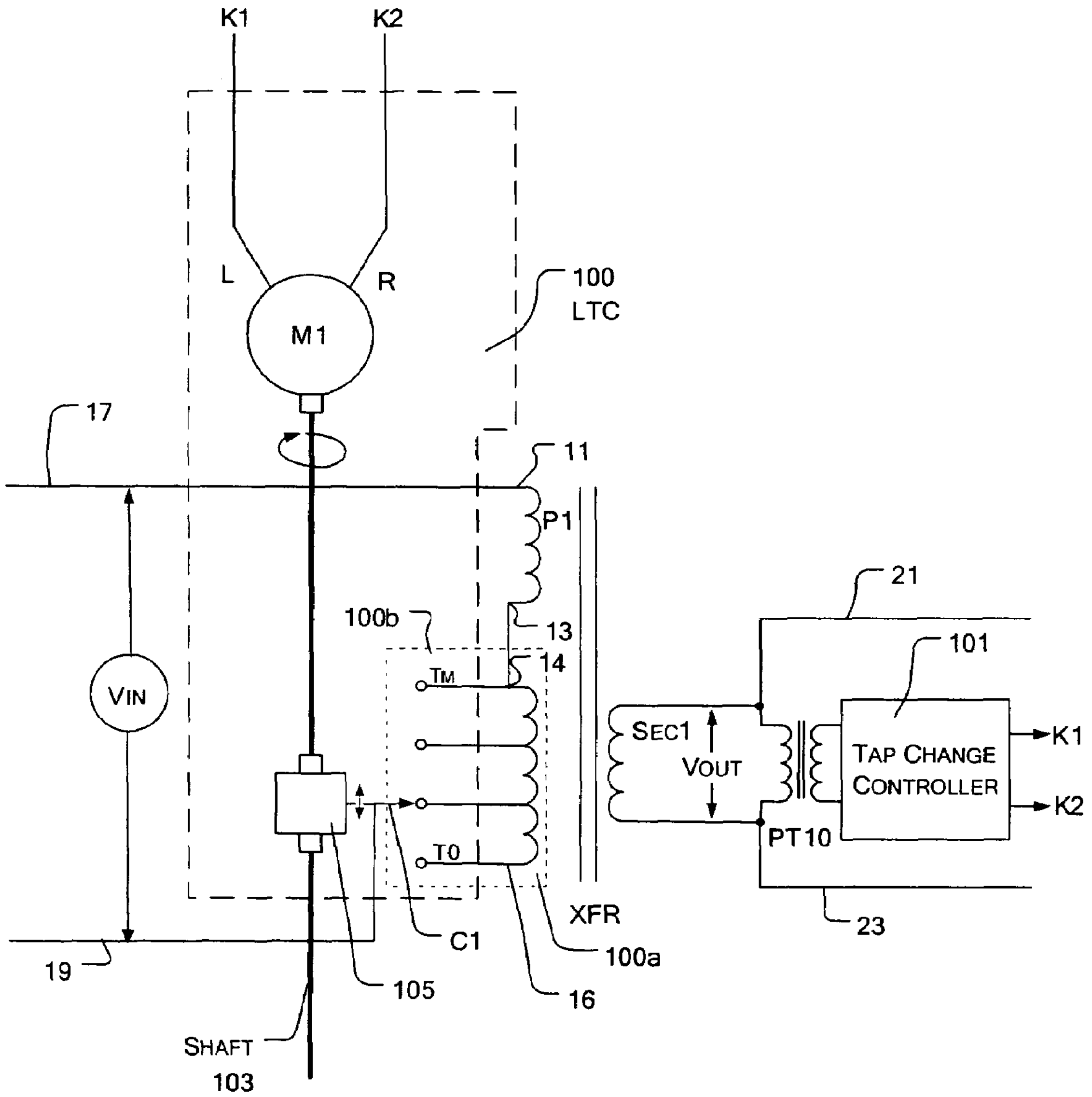
FIG 1 PRIOR ART
FIGS. 1 and 2 are highly simplified semi block, semi schematic, diagrams of prior art circuits including a power transformer with a load tap changer (LTC)
Figure 2:
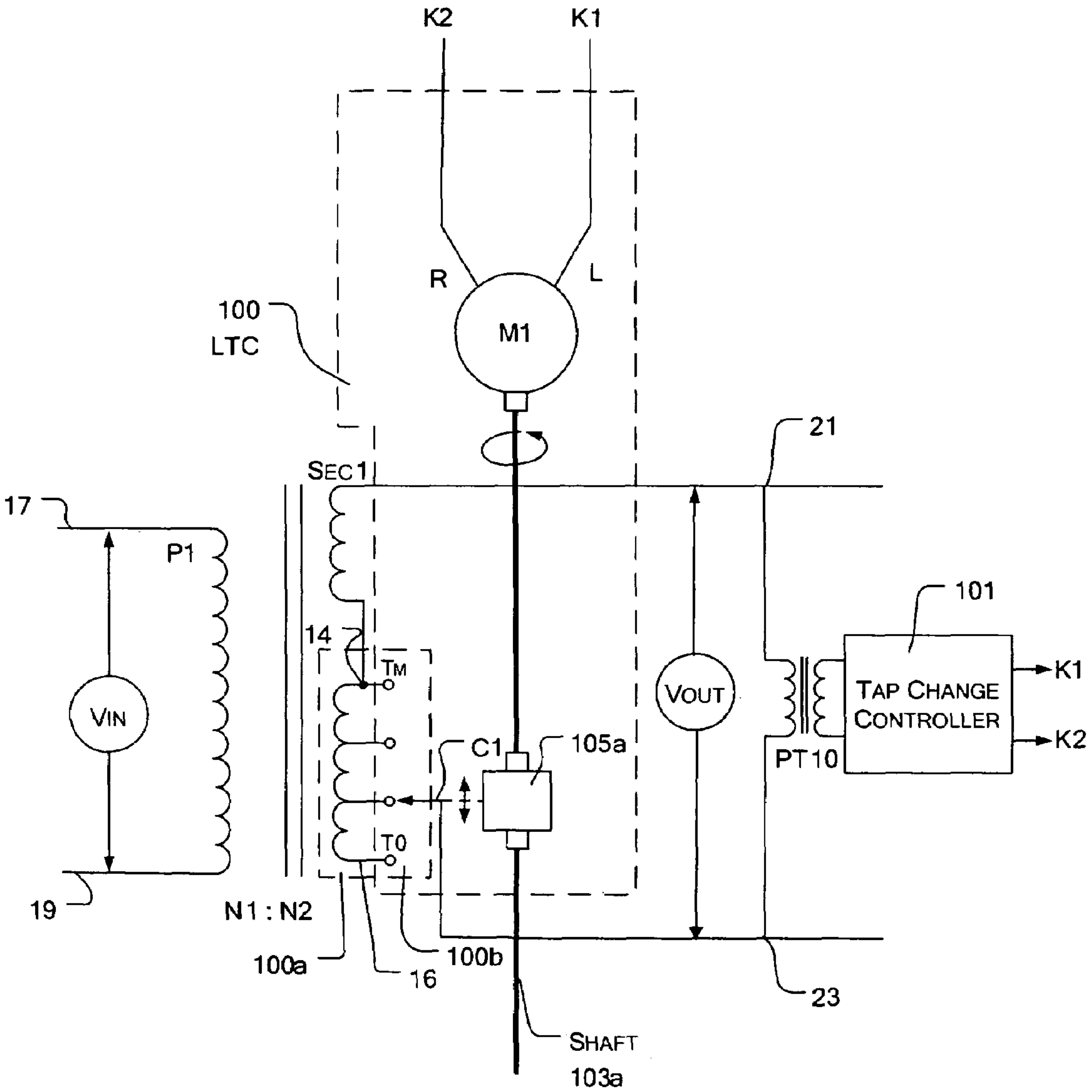
FIG 2 PRIOR ART
Figure 3:
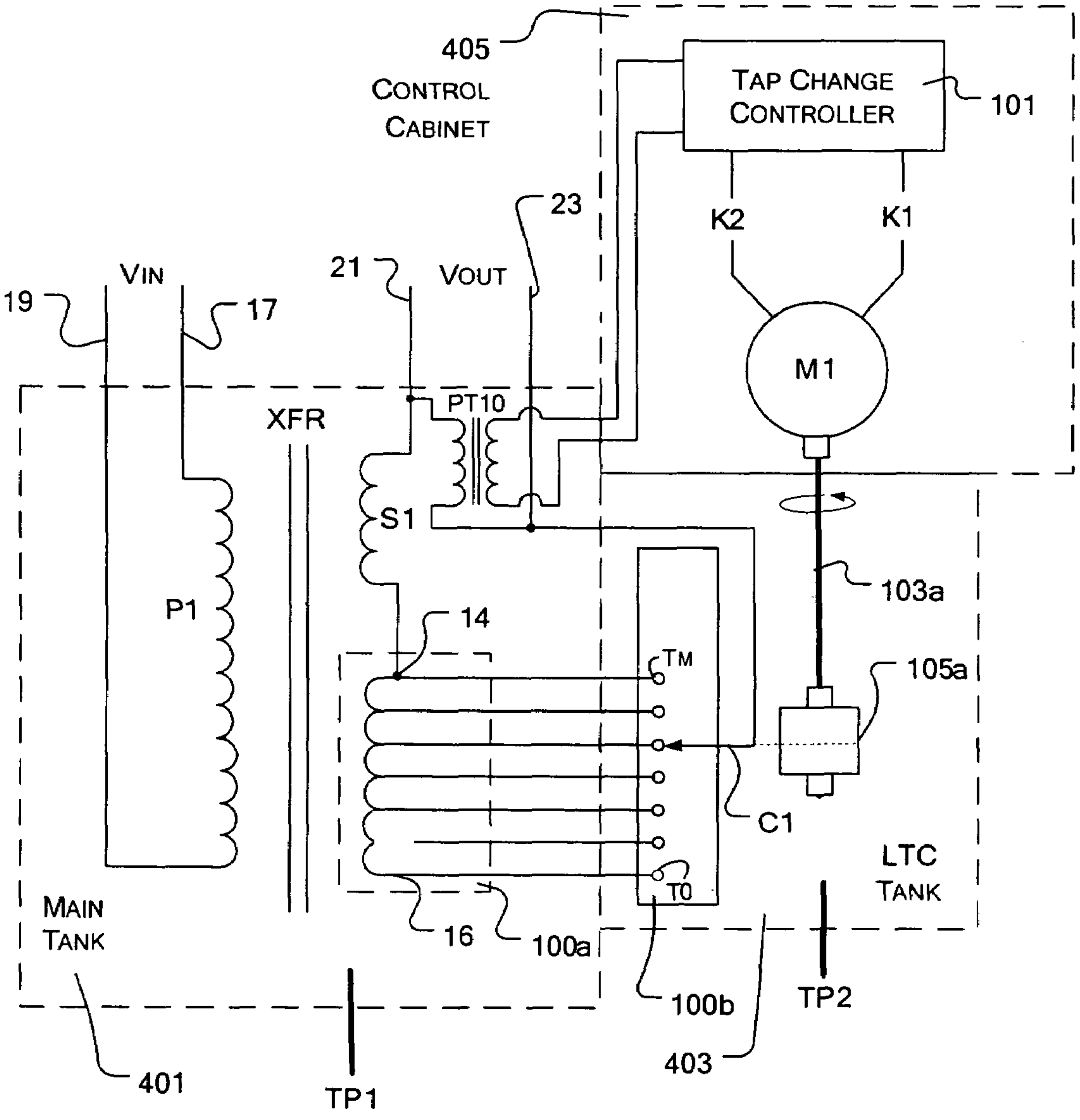
FIG. 3 is a simplified block diagram of a main tank housing a power transformer side by side with an LTC tank housing the LTC taps with their temperature probes and also showing a control cabinet.
Figure 4:
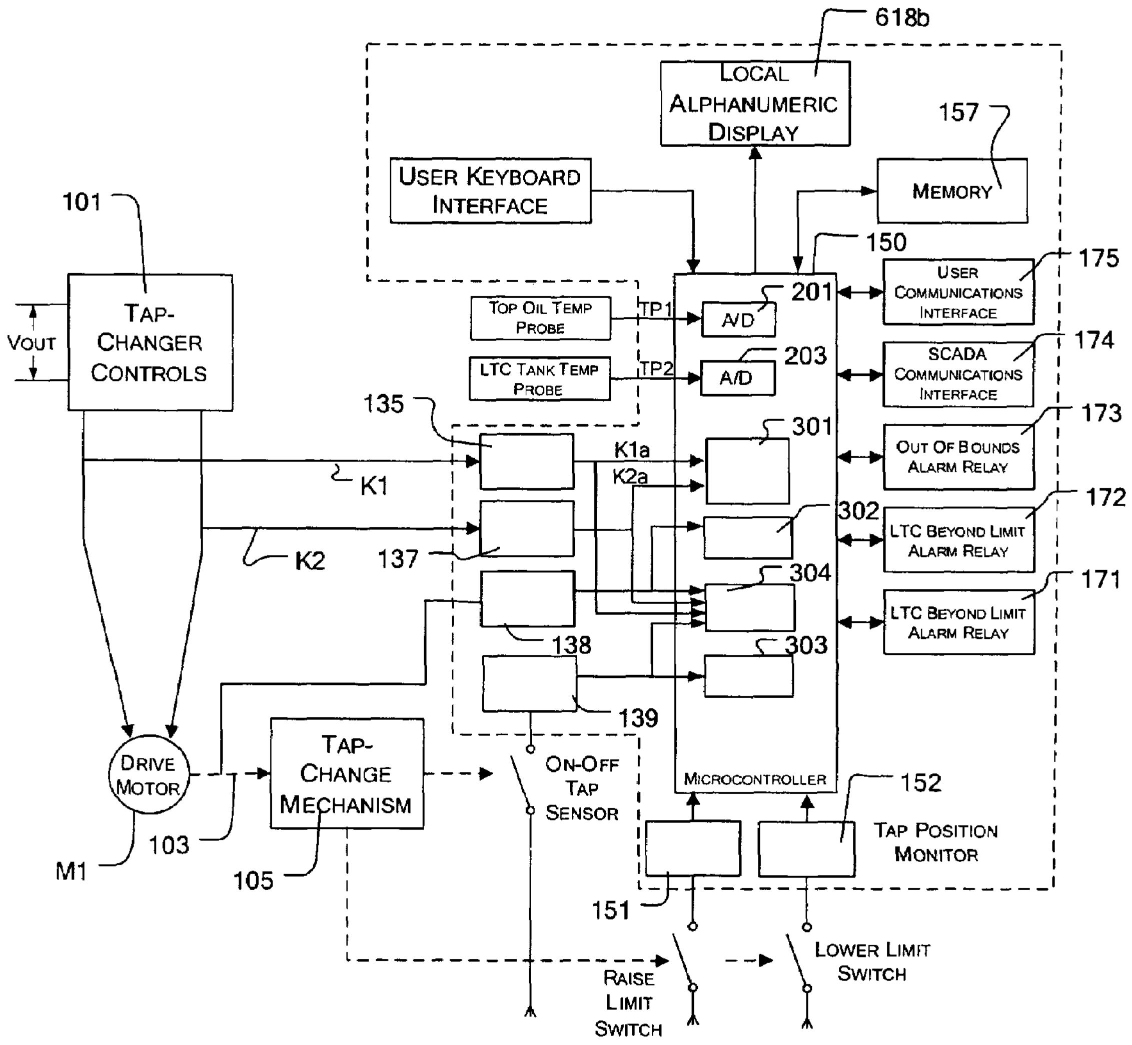
FIG. 4 is a simplified semi block, semi schematic, diagram of circuitry used to practice the invention.

As shown in FIG. 3, the main power transformer, XFR, the LTC windings 100*a* and the potential sensing transformer PT10 may be housed in a main tank 401. The LTC taps 100*b* (taps $T_0$-$T_M$ connected to windings 100*a*) may be housed in a different, adjacent, LTC tank 403. The tap change controller 101 and the motor M1, as well as some of the system electronics, may be located in an adjacent control cabinet 405. The tanks 401 and 403 may be filled with a fluid (e.g., oil) for distributing the heat generated by their respective components and preventing any hot spots. A main tank temperature probe, TP1, (also called the top oil temperature probe) may be used to measure the temperature of the main tank 401. The LTC temperature probe, TP2, may be used to measure the temperature of the LTC tank. In general, the main transformer tank 401 and the LTC tank 403 are separate tanks and do not share the same fluid. However they are thermally connected. The volume of oil in the main tank is generally much greater than that in the LTC tank. As shown in FIG. 4, the outputs of probes TP1 and TP2 are fed via analog to digital converters to a microcontroller for processing the temperature information and for comparing measured temperature signals versus specified values.

An aspect of the heating problem may be better understood by noting that the main tank 401 contains the transformer primary and secondary windings and, usually, the LTC windings 100*a* and potential transformer PT10. With loading, these windings generate heat due to $I^2R$ losses in the windings and eddy currents in the steel core. The heating in the main tank influences the temperature in the LTC tank. But, the temperature of the main tank should generally be higher than the temperature of the LTC tank since there is no significant source of heat in the LTC tank, when the LTC is operating correctly. However, heating within the LTC tank may be caused by a number of factors. For example, heating can be caused by arcing due to dielectric breakdown or, if equipped with vacuum interrupters, a breach in the interrupter. Another source of heating may occur in the LTC tank due to carbonization of the switching contacts. This phenomenon is also known as "coking". For example, the oil in the LTC tank 403, which is present between a contact and a tap position, may begin to polymerize due to conduction between the contact and the tap. As this polymerization takes place the resistance of the contacts increases. At first it may be virtually undetectable. However, the polymer film may begin to burn and, as it carbonizes, there is a further increase in the contact resistance. This gives rise to a vicious cycle that eventually causes the contacts to get so hot that the oil in the LTC tank may become hotter than that of the main tank. Abnormal heating may cause the evolution of combustible gases, which create high pressure within the LTC tank leading to catastrophic failure. Coking and polymerization effects tend to develop slowly. Problems such as arcing evolve quickly with little warning. The malfunctions discussed above may result in damage, which may be irreversible, to the LTC and to the power transmission system. It is therefore important to have reliable information regarding both types of problem conditions and to be able to process the information accurately.

In accordance with one aspect of the invention, the arithmetic difference of the temperature between the main tank and the LTC tank is calculated to determine whether the temperature in the LTC tank 403 is more, or less, than the temperature in the main tank 401. This is monitored to determine if, and when, the temperature of the LTC tank exceeds the temperature in the main tank. If the LTC tank temperature exceeds the main tank temperature for longer than a preset period of time a problem may be present and an alarm signal is produced.

In accordance with another aspect of the invention, the LTC tank temperature is monitored for each tap position to determine potential problems associated with a tap generating excessive heat. This information is important to identify defective or "bad" tap positions. A tap position is defective ("bad") when that tap is being contacted by the contacting element and the LTC tank temperature is greater than the main tank temperature (or some specified value of temperature) for an extended period of time (e.g., a period of several hours). Each defective or "bad" tap position is identified and recorded and the system (e.g., microcontroller 150 in FIG. 4) is programmed to cause the contacting element to move off the bad tap and, if needed, to by-pass the "bad" tap in the future. The by-passing of a bad tap requires careful system programming to ensure that the feedback loop including tap change controller 101 accepts the value of Vout produced by contacting the next tap (up or down) to a bad tap.

As already noted, FIG. 4, shows that the temperature in the main tank is constantly monitored via the top oil temperature probe TP1 whose output is fed via an A/D converter 201 to the microcontroller 150. Likewise the temperature in the load tap changer (LTC) tank is constantly monitored via LTC temperature probe TP2 whose output is fed via an A/D converter 203 to the microcontroller.

Applicant recognized that the main tank temperature is generally higher than the LTC tank temperature since under normal operating conditions there are substantial heat sources in the main tank and very few in the LTC tank. Therefore, in order to sense a possible problem, the system is designed to sense the LTC tank temperature ($T_{LTC}$) minus the main tank temperature ($T_K$). So long as $T_{LTC}$ is less than $T_K$, there is no problem. However when $T_{LTC}$ is higher than $T_K$, by some predetermined amount and this temperature differential exceeds a predetermined value for longer than a predetermined amount of time, it is indicative of the existence of a problem. Consequently, the system is designed to alert the user or operator that there is a problem or malfunction which needs to be addressed.

Figure 5:
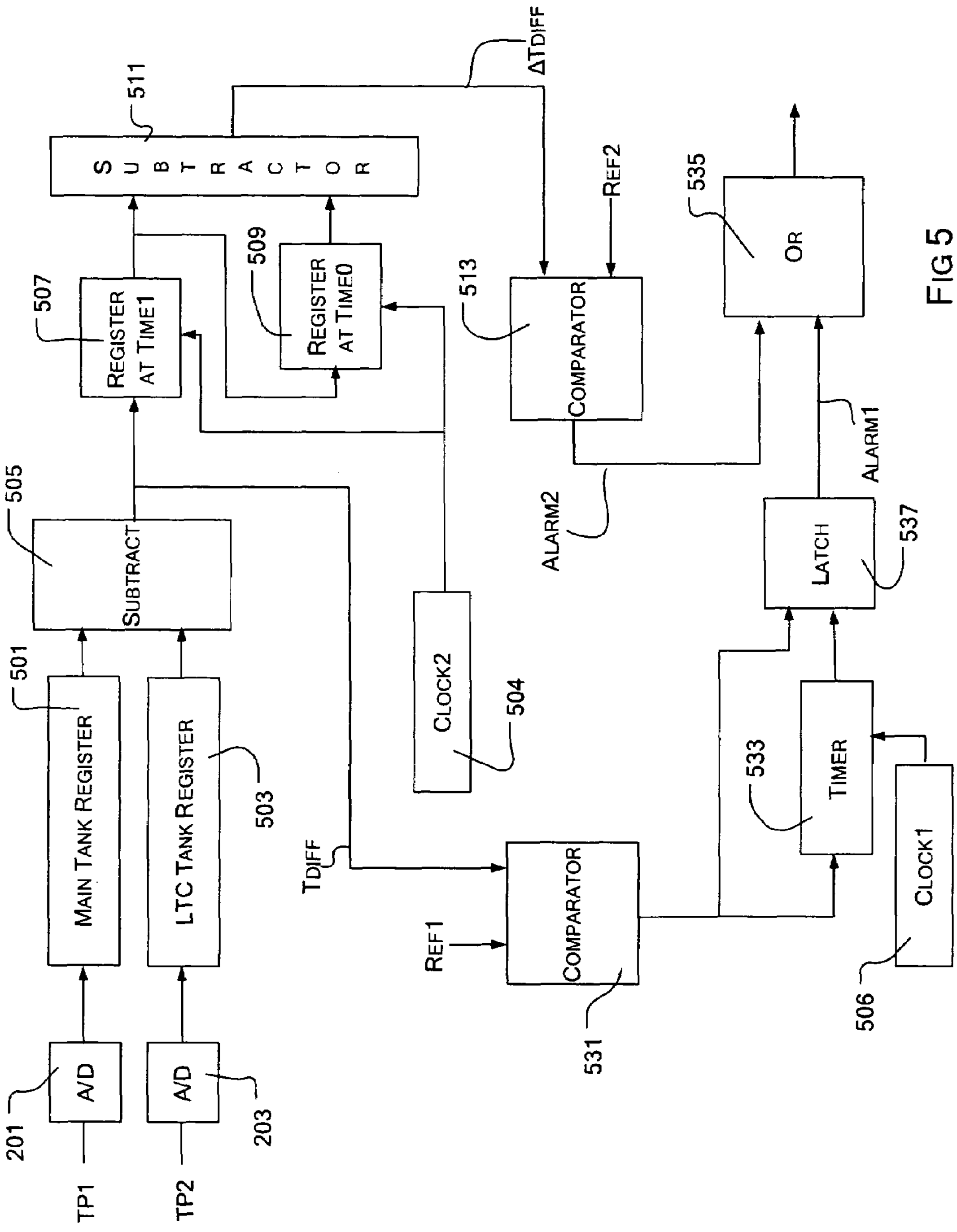
FIG. 5 is a block diagram of circuitry for processing temperature information in accordance with the invention.
Figure 6:
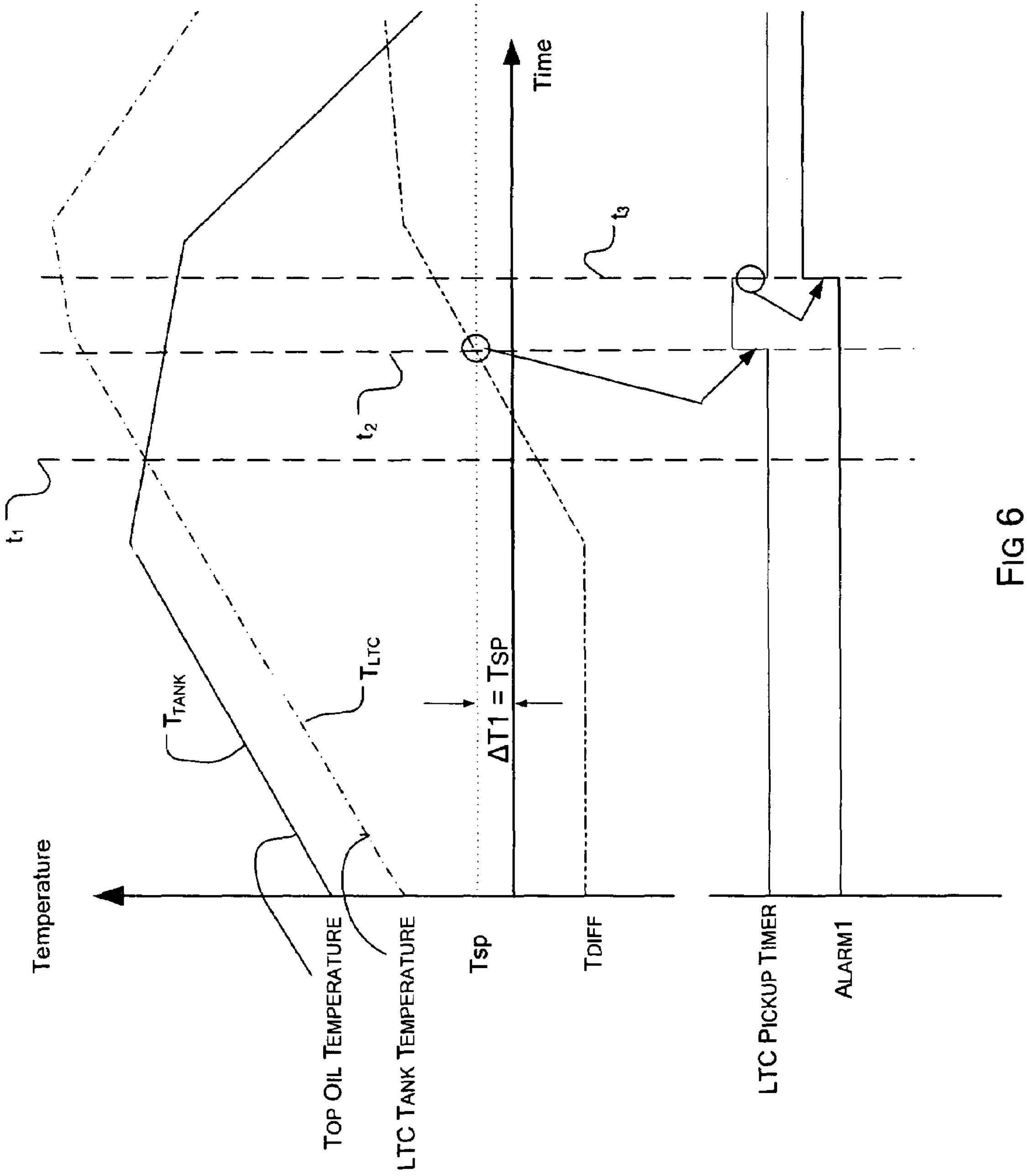
FIG. 6 is a diagram of waveforms illustrating the detection of slowly evolving heating conditions.

In particular, reference is made to FIG. 5 which shows TP1 measuring the main tank (Top Oil) temperature applied to A/D converter 201 and TP2, measuring the LTC tank temperature, is fed to A/D converter 203. The digital word representing the temperature of the tanks is fed into Main Tank Register 501 and LTC Tank Register 503 respectively. These registers are then fed into a subtractor 511 which computes $T_{LTC}-T_{TANK}=T_{DIFF}$. The value of $T_{DIFF}$ may vary as shown in FIG. 6 and may be characterized as generally representing relatively slowly changing temperature conditions. Note that $T_{LTC}$ is compared to $T_{TANK}$. So long as $T_{LTC}$ is less than $T_{TANK}$, there is no need for concern and hence no output. It is only when the temperature differential ($T_{DIFF}$) between $T_{LTC}$ and the main tank temperature ($T_K$) exceeds a predetermined set point (an amount shown as delta T1 at time t2 in FIG. 6) and identified as Tsp, that a timer is set and begins to count the length of time that $T_{DIFF}$ exceeds the set point temperature, Tsp. Signals corresponding to $T_{DIFF}$ and Tsp (shown as Ref1) are applied to comparator 531 which functions to detect when $T_{DIFF}$ exceeds Tsp, the output of comparator 531 is fed to a timer 533 preset for a given time period and a latch 537. A clock 506 is applied to timer 533 and, if the comparator output persists for the preset time period, a signal is applied to latch 537 causing an alarm to be generated (e.g., alarm 1 at time t3 in FIG. 6).

Figure 7:
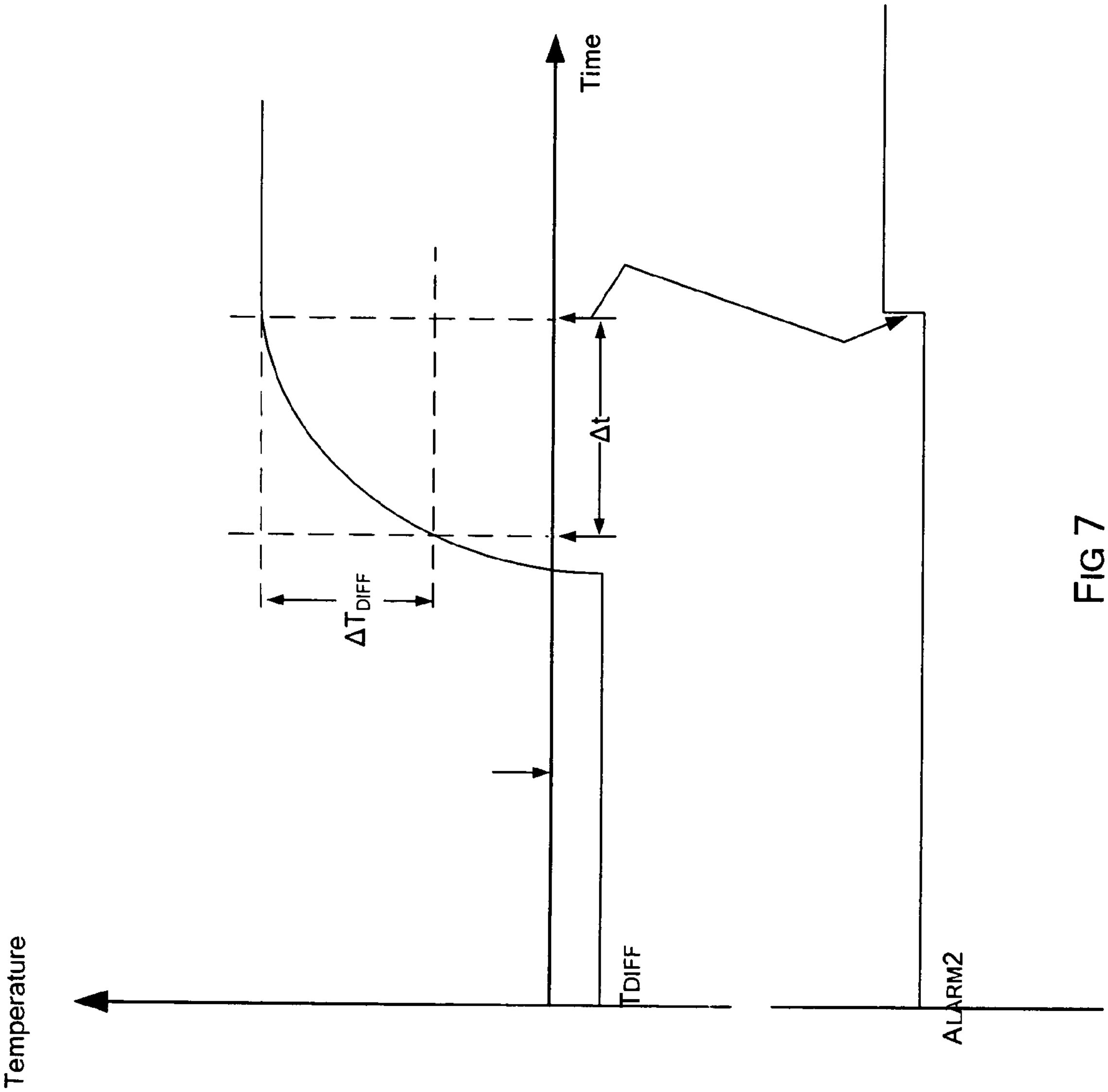
FIG. 7 is a diagram of a waveform illustrating the detection of a rapidly evolving heating condition.

In accordance with the invention the rate of change in $T_{DIFF}$ is also calculated and used to provide an indication of rapid changes. The rate of change is accomplished by means of registers 507 and 509 and a subtractor 511. The registers 507 and 509 are clocked by clock 504 and function to compare a present value of temperature (at a time t1) with a previous value of temperature (obtained or clocked at time t0). Subtracting the two values of temperature and dividing by the time differential provides the value of "Delta $T_{DIFF}$" as shown in FIGS. 5 and 7. Delta $T_{DIFF}$ and a ref2 are applied to a comparator 513. Ref2 represents a specified value of permissible at which the temperature can change. If exceeded, it is indicative that the temperature is rising (changing) too quickly and that there may be a malfunction. Accordingly, when this happens, comparator 513 outputs a signal denoted as alarm2 which is fed into an OR gate 535. The other input to OR gate 535 is the alarm signal responsive to $T_{DIFF}$. Thus, the system is designed to provide an alarm indication when there is a slow changing temperature problem condition and when there is rapid changing temperature problem condition.

Note that the circuit of FIG. 5 is presented for purpose of illustration and that the microcontroller may be programmed and/or designed to provide the functions described above.

The steps to perform temperature sensing in accordance with the invention include:

1—measure the main tank temperature ($T_K$);

2—measure the LTC tank temperature ($T_{LTC}$);

3—calculate $T_{Diff}=[(T_{LTC})-(T_K)]$; (normally $T_K$ is greater than $T_{LTC}$);

4—determine when $T_{Diff}$ becomes positive; i.e., when $(T_{LTC})>(T_K)$;

5—as an option, introduce an offset such that $T_{LTC}$ must exceed $T_K$ by some set temperature level (e.g., Tsp) to define an alarm condition. Tsp may range from zero to ten or more degrees.

6—specify the length of time ($T_{LTC}$) must exceed ($T_K$) for an alarm condition to be defined;

7—sense how long ($T_{LTC}$) exceeds ($T_K$ ) for establishing an alarm condition and compare to specified period.

8—Concurrently, the rate at which $T_{DIFF}$ changes as a function of time may be calculated by selecting a time increment (Delta t) and comparing the value of $T_{DIFF}$ per time increment. For example:

(i) $A=[T_{DIFF}=T_{LTC}-T_K]$ at time t=t0;

(ii) $B=[T_{DIFF}=T_{LTC}-T_K]$ at time t=t1; and

[A−B]/delta t, where delta t is equal to t0−t1, gives a rate of rise for the delta t selected 9. Specify the amount of permissible/specified change and compare to the calculated/measured value.

10. The rate of rise has been calculated for $T_{DIFF}$, but a similar calculation could be done for $T_{LTC}$.

11. Alarm signals are generated if the rate of rise of $T_{DIFF}$ is greater than the maximum rate specified and/or if the LTC tank temperature exceeds the main tank temperature by a specified level for a specified period of time.

As discussed above, the temperature differential ($T_{DIFF}$) is equal to the temperature of the LTC tank ($T_{LTC}$) minus the temperature of the main tank ($T_K$). As shown in the figures and as discussed, circuitry or programming is provided to sense the rate of change of $T_{DIFF}$ by including means for sensing $T_{DIFF}$ at different points over a predetermined time interval (e.g., $T_{DIFF}$ at a first time (t1) and $T_{DIFF}$ at a second time (t2)) where the time interval t2−t1 is a pre-selected time interval. The time interval could be per minute, per hour or any other selected time. The actual rate of change is the determined by calculating $T_{DIFF}$ at time t2 minus $T_{DIFF}$ at time t1 divided by the time interval t2−t1. The obtained rate of change can then be compared to a maximum specified or desirable rate of change and circuits are provided to produce an alarm if the rate is exceeded.

What is claimed is:

1. In a system which includes a load tap changer (LTC) having a plurality of windings, selected ones of which are selectively coupled to one of the primary and secondary of a power transformer in order to regulate the output voltage of the transformer and wherein the LTC includes a plurality of taps physically and electrically connected to and along the windings and contact is selectively made to the taps to increase or decrease the output voltage of the transformer by moving a contacting element from a tap to another tap along the LTC winding and wherein the power transformer and the LTC windings are placed in a main tank and the taps are placed in an LTC tank, and wherein the temperature in the main tank is monitored by means of a first probe and the temperature in the LTC tank is monitored by means of a second probe, the improvement comprising:

means coupled to said first and second probes for sensing the temperature differential between the main tank and the LTC tank and determining if the LTC tank temperature exceeds the main tank temperature for a period of time exceeding a specified time period and for sensing the rate of change of the temperature differential and determining if it exceeds a predetermined value.

2. In the system as claimed in claim 1, further including means for sensing the LTC tank temperature for each tap position and monitoring those taps for which the LTC tank temperature exceeds a specified value of temperature, wherein those taps are denoted as bad taps.

3. In the subsystem as claimed in claim 2, further including means for storing information pertaining to bad taps and means inhibiting their use.

4. In the system as claimed in claim 1, wherein there is included means for sensing the output voltage of the power transformer and wherein said sensing means includes means for producing a tap change command causing the contacting element to be moved from a present tap to another tap in order to cause the output voltage of the transformer to have a predetermined value.

5. In the system as claimed in claim 4, wherein the temperature of the main tank is sensed by means of the first probe which is a first temperature probe coupled to the main tank and the temperature of the LTC tank is sensed by means of the second probe which is a second temperature probe coupled to the LTC tank; wherein the first and second temperature probes produce first and second sets of signals, corresponding to the temperature of their respective tanks, which are applied to a comparator circuit for producing a first output to indicate when the temperature of the LTC tank exceeds the temperature of the main tank.

6. In the system as claimed in claim 5, wherein the first output is supplied to a timing circuit for sensing whether the first output continues for a period of time exceeding a specified time; and wherein an alarm signal is generated if the first output continues for longer than said specified time.

7. In the system as claimed in claim 5, wherein the first output is supplied to circuitry for calculating the rate of change of the first output, and wherein the rate of change of the first output is compared to a specified maximum rate of change to produce an alarm signal if the specified maximum rate is exceeded.

8. In the system as claimed in claim 1, wherein the temperature differential ($T_{DIFF}$) is equal to the temperature of the LTC tank ($T_{LTC}$) minus the temperature of the main tank ($T_K$); and wherein the means for sensing the rate of change of $T_{DIFF}$ includes means for sensing $T_{DIFF}$ at a first time (t1) and for sensing $T_{DIFF}$ at a second time (t2); wherein the time interval t2−t1 is a pre-selected time interval; and includes means for calculating $T_{DIFF}$ at time t2 minus $T_{DIFF}$ at time t1 divided by the time interval t2−t1.

9. In the system as claimed in claim 1, wherein each one of said main and LTC tanks is filled with a fluid for causing the heat to be uniformly distributed.

10. In the system as claimed in claim 4, wherein the means for sensing the output voltage of the power transformer includes a potential transformer coupled to a tap change control circuit for producing tap change commands when the output voltage of the power transformer is above or below a specified value.

11. In the system as claimed in claim 10, wherein the means for moving the contacting element includes a motor driven by an output of the tap change control.

12. In a system which includes a power transformer having a primary and a secondary and a load tap changer (LTC) having a plurality of windings connected to one of the primary and secondary of the power transformer in order to regulate the output voltage of the power transformer and wherein the LTC includes a plurality of taps physically and electrically connected to, and along, the LTC windings and a contacting element is selectively moved from a tap to another tap to increase or decrease the output voltage of the power transformer, and wherein the power transformer and the LTC windings are placed in a main tank and the taps are placed in an LTC tank, and wherein a first probe monitors the temperature in the main tank and a second probe monitors the temperature in the LTC tank, the improvement comprising:

means coupled to the first and second probes for sensing signals produced by said first and second probes for determining the temperature differential ($T_{DIFF}$) between the main tank and the LTC tank and determining if the LTC tank temperature exceeds the main tank temperature for a period of time exceeding a specified time period and for sensing the rate of change of $T_{DIFF}$ as a function of time and determining if it exceeds a predetermined value.

13. In the system as claimed in claim 12 further including means responsive to $T_{DIFF}$ exceeding a specified value for a specified period of time or to the rate of change of $T_{DIFF}$ exceeding a predetermined value for generating alarm signals.

14. In the system as claimed in claim 12 wherein the system includes a microcontroller and memory circuits programmed to process the signals and perform the calculations and comparisons.

15. In the system as claimed in claim 12 wherein the means for sensing signals produced by said first and second probes for determining the temperature differential ($T_{DIFF}$) between the main tank and the LTC tank and determining if the LTC tank temperature exceeds the main tank temperature includes means for ensuring that the LTC tank temperature exceeds the main temperature by a predetermined offset.

* * * * *